March 21, 1961   R. E. POULSEN   2,976,374
EXTENSION CORD REEL
Filed Feb. 17, 1958   2 Sheets-Sheet 1

INVENTOR.
RALPH E. POULSEN.
BY *Sellers and Latta*
ATTORNEYS

March 21, 1961

R. E. POULSEN 2,976,374

EXTENSION CORD REEL

Filed Feb. 17, 1958

INVENTOR.
RALPH E. POULSON
BY *Sellers and Latta*
ATTORNEYS

United States Patent Office 2,976,374
Patented Mar. 21, 1961

---

2,976,374

EXTENSION CORD REEL

Ralph E. Poulsen, 6457 Aqueduct Ave., Van Nuys, Calif.

Filed Feb. 17, 1958, Ser. No. 715,597

8 Claims. (Cl. 191—12.4)

This application is in part a continuation of my pending application S.N. 634,321, filed January 15, 1957, for Cord Reel, now abandoned.

This invention relates to cord reels in general and in particular to a combination cord reel and extension cord having plug and socket elements at respective ends of the cord and operable for plug-in connection between a service outlet of a power line and an electric appliance, with any selected portion of the cord reeled within the cord reel and the remainder thereof extended out of the cord reel to bridge the distance between the outlet and the appliance.

More specifically, the invention contemplates a cord reel having spring powered means for automatically winding the cord into the reel and operable for withdrawal of the cord by the simple operation of holding the reel in one hand and pulling the external portion of the cord with the other hand.

A further object is to provide such a cord reel embodying a simple, novel and improved means for locking out the spring powered reeling mechanism so as to relieve the cord of the tension load thereof and allow it to extend in a slack condition between the appliance and the service outlet. Obviously, it would be undesirable to have the cord stretched under tension between the appliance and the outlet, while being used for conveying power to the appliance. Such a condition would cause interference with the free space around the appliance, would tend to pull the plug from the outlet socket and to disconnect the cord from the appliance, and would be wholly undesirable.

An important object of the invention is to provide a cord reel of relatively simple construction comprising a casing, a winding drum rotatably mounted in the casing, spring means for rotating the drum within the casing in the direction to wind up the cord, locking means for holding the drum in any selected unwound position, and a cord having on one end a male connector plug which is removably socketed in a recess in one end of the winding drum, extends into and through the central body of the drum and thence radially across the reel and through an aperture in the side of the casing, and has at its other end a female connector element for attachment to an appliance. In this connection the invention aims to provide an extension cord reel assembly wherein the cord can be renewed from time to time by lifting the male connector element out of its socket, detaching the cord therefrom, pulling the freed end of the cord out of the reel and installing a replacement cord by a reverse series of steps.

The invention contemplates an improved locking mechanism which is operable, when set, after withdrawing any selected portion of the cord, to lock the reel for automatically securing the withdrawn portion of the cord in extended position without requiring any further manipulation of the locking mechanism.

As a preferred form of locking means, the invention provides a positive locking device which is controlled by an element on the casing of the reel which may be engaged by the thumb of the operator for locking and unlocking the reel. More particularly, the invention contemplates a locking device of very simple and inexpensive construction, a portion of which is an integral part of the cord winding drum of the device.

As a modified form, the invention contemplates a locking mechanism utilizing a friction-brake principle, wherein any selected amount of braking load can be applied, such that, with the brake set, it can be overcome by a fairly substantial pull applied to the cord for the purpose of withdrawing any selected portion of the cord from the reel, and will become effective to lock the reel when the pull on the cord is released. This form of the invention further provides for releasing the lock by a quick manipulation of the reel casing.

A further object is to provide a reel embodying a simple and improved arrangement for mounting a wind-up spring between one end of the cord winding drum and the opposed end of the casing of the device.

Other objects will become apparent in the ensuing specifications and appended drawing in which.

Figure 1:
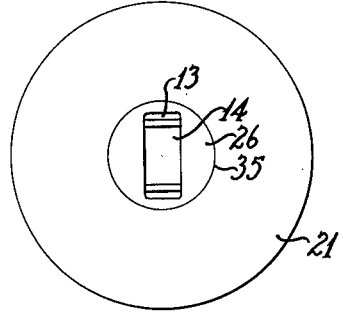
Fig. 1 is a plan view of a cord reel embodying my invention.

*Description of invention as shown in Figs. 1–6*

Referring now to the drawing in detail, I have shown therein in Figs. 1–6, as an example of one form in which the invention may be embodied, a combination of a cord reel A and an extension cord B normally reeled therein and adapted to have any selected portion of its length withdrawn for connecting an appliance to a power service outlet. The extension cord B consists in an electrical contductor cord 10, a plug 11 and one end thereof, adapted to be inserted into a service outlet socket, and a socket 12 at the other end thereof, adapted to be attached to the terminal prongs of an appliance. The extension cord B is removable associated with the reel A, and to facilitate the attachment and removal of the extension cord the plug 11 may be of a known type embodying prongs 13 which are hinged to a body 14 for spreading movement which is operative to release the ends of the conductor wires of cord 10 from conducting connections to prongs 13 which are established by jaws (not shown) integral with the prongs 13 and which are jammed against the wire ends when the prongs 13 are in the closed positions shown in Fig. 4. Since such connector plugs are well known, the details are not illustrated herein. The plug 11 also includes latching tongues 15 by means of which the plug 11 is normally latched into a socket in the reel unit A as will hereinafter be more fully set forth.

The reel unit A includes a casing body comprising a cylindrical lateral wall section 16 and a flat bottom section 17, the wall section 16 having a rim flange 18 of reduced thickness, provided with an external male thread 19. A cover section including an internally threaded rim 20 and a flat top wall portion 21, is threaded into the flange 18, the rim 20 having a female thread meshing with the male thread 19 of rim 18. Preferably, the cylindrical outer wall of rim 20 is of the same diameter and constitutes a continuation of the outer wall of casing portion 16.

Figure 3:
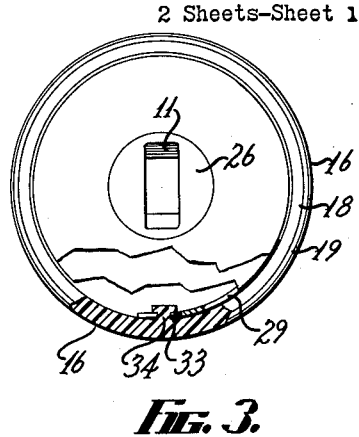
Fig. 3 is a radial sectional view thereof taken generally as indicated by the line 3—3 of Fig. 2.
Figure 2:
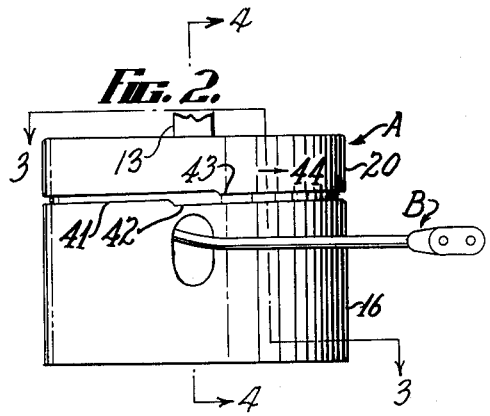
Fig. 2 is a side elevation thereof.
Figure 6:
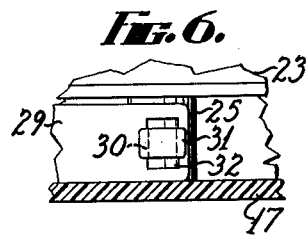
Fig. 6 is a fragmentary detail sectional view taken on the line 6—6 of Fig. 5.
Figure 4:
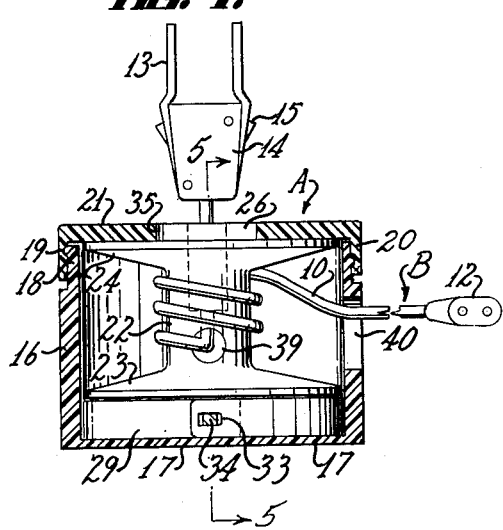
Fig. 4 is an axial sectional view thereof taken on the line 4—4 of Fig. 2, with the reel drum shown in elevation.
Figure 5:
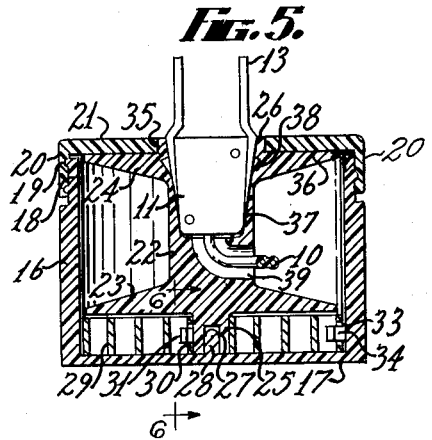
Fig. 5 is an axial sectional view thereof in a plane at right angles to that of Fig. 4, taken on the line 5—5 of Fig. 4, and showing the reel drawn in section.
Figure 7:
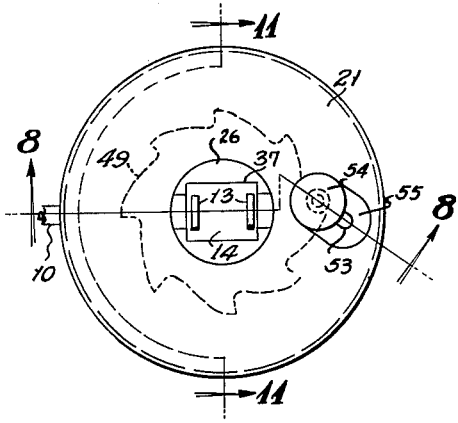
Fig. 7 is a plan view of a cord reel embodying a preferred form of the invention.
Figure 8:
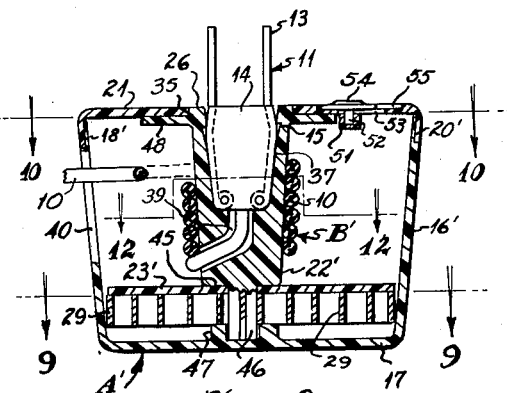
Fig. 8 is an axial sectional view of the same taken on line 8—8 of Fig. 7, the reel being shown in elevation.
Figure 9:
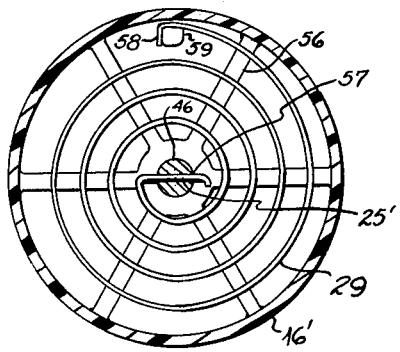
Fig. 9 is a radial sectional view thereof taken on line 9—9 of Fig. 8.
Figure 10:
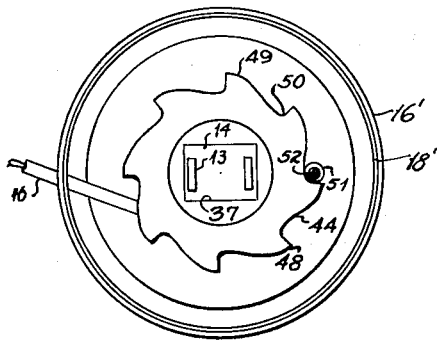
Fig. 10 is a radial sectional view of the same taken on line 10—10 of Fig. 8.
Figure 11:
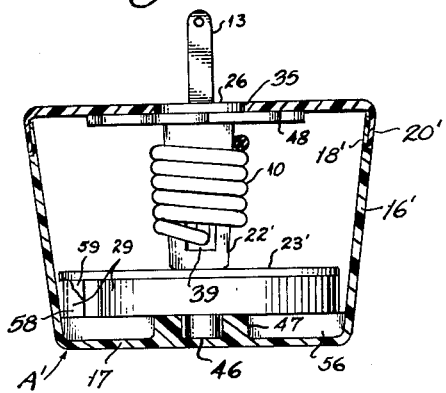
Fig. 11 is an axial sectional view taken on line 11—11 of Fig. 7.
Figure 12:
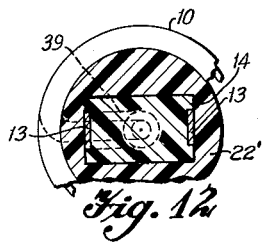
Fig. 12 is a cross sectional view of the hub of the reel drum, taken on line 12—12 of Fig. 8.

Rotatably mounted within the casing 16–21 is a reel drum including a cylindrical drum body 22, end flanges 23 and 24, and hubs 25 and 26 projecting from the respective ends thereof and rotatably mounting the drum in the casing. Hub 25 has a cylindrical bearing recess 27 in which is received a pivot stud 28 projecting inwardly from the center of casing bottom 17. It has a cylindrical outer wall, to which is attached one end of a spring motor 29 of clock-spring type, which provides the power for automatic winding of the reel drum. Referring to Fig. 6 the connection of the spring 29 to the hub 25 is provided for by an anchor stud 30 having an elongated rectangular head 31, the stud 30 being extended through an elongated aperture 32 extending transversely in the end of the spring 29. Aperture 32 is of substantially the same proportions as head 31 but slightly larger, so that the head 31 may be received therethrough when the end of spring 29 is rotated through 90° from a position shown in Fig. 6. When returned to the position of Fig. 6 the spring becomes locked to the stud 30 by the projection of the respective end portions of head 31 over the side margins of aperture 32. The spring 29 is attached to the hub 25 before the drum is inserted into the casing, the edges of the spring resting against the outer face of flange 32, which is flat. The outer end of spring 29 is provided with an aperture 33 (Fig. 3) which is elongated along the longitudinal axis of the spring, and which receives a hook 34 in the form of a headed stud similar to the stud 30, 31, the elongated head thereof extending parallel to the slot 33. In assembling the reel, the outer end of the spring is manipulated to a position where the slot 33 registers with the head of hook 34 and the outer end of the spring is then slipped over the hook and shifted circumferentially until it is hooked beneath the head of the hook as shown in Fig. 3.

Hub 26 constitutes a trunnion, having a cylindrical outer wall which is journalled within a cylindrical opening 35 in top 21. Top 21 has a flat inner wall which engages a flat end face 36 of drum flange 24 to provide a frictional breaking action when the cover 20, 21 is screwed down upon the body flange 18. The end of hub 25 bears against bottom 17 of the casing to carry the braking loads developed between the cover and the flange 24. The spring 29 is received within an annular space defined between flange 23 and bottom 17 and is free of any gripping action between these members even when maximum braking load is applied to the flange 24. Accordingly, the full power of the spring load is applied to the reel drum at all times, and the motor becomes automatically operative, immediately when the braking engagement between top 21 and flange face 36 is relieved, to rotate the reel drum for winding up the cord 10.

The plug unit 11 is normally received in a fitted socket 37 extending through hub 26 and flange 24 and into reel drum body 22. Latch tongues 15 are engaged in latch recesses 38 in the hub 26 to normally retain the plug 11 in the socket 37 with its outer end flush with the end of hub 26, and with the prongs 13 projecting for reception in a service outlet socket.

The cord 10 extends from the inner end of plug 11 through an elbow passage 39 in drum body 22 to the cylindrical outer surface of the latter, around which it is thence wound. The opposite end of the cord 10 extends out of the reel through a mouth 40 in lateral wall section 16. Plug 12 is wider than the diameter of mouth 40 and thus functions as a stop to limit the wind-up action at the point where all of the cord has been drawn into the reel and the plug 12 has engaged against the casing wall 16.

The plug 11 can be simply lifted out of socket 37 in order to release its prongs 13 for manipulation to release the plug from the end of cord 10. Thus any desired length of cord (within the limits of capacity of drum 22–24) can be quickly and easily installed in the reel, such operation involving threading the free end of the new cord through casing mouth 40, elbow passage 39 and socket 37 until it may be grasped and pulled through sufficiently for attachment to plug 11.

Casing wall 16 has a shoulder 41 defined at the base of rim 18, and the edge of cover rim 20 is adapted to approach substantial engagement with shoulder 41 in a tightened, braking position of the cover. The invention provides means for latching the cover in the proper braking position, said latching means comprising a detent recess 42 in shoulder 41 and a latching tooth 43 of shallow saw-tooth form, on the edge of rim 20, one end of tooth 43 providing an abrupt locking shoulder which is adapted to engage a corresponding shoulder at one end of recess 42. From its locking shoulder, tooth 43 has a low-angle slope to the plane of the edge of flange 20, providing a camming face which is engageable with a correspondingly inclined face of recess 42 to provide a camming action that is operative to spring the adjacent portion of flange 20 away from shoulder 41 in an unscrewing action (in the direction indicated by arrow 44) applied to cover 20, for releasing the tooth 43 from the detent recess 42. The abrupt shoulders of the tooth and recess function to limit the tightening rotation of the cover (with a right-hand threading operation in the arrangement shown). The engagement of the inclined cam faces of the tooth and recess is sufficient to retain the cover in the braking position when released by the operator's hand. The material of the cover and casing body is resilient to accommodate the springing action required for forcing the tooth 43 past the portion of shoulder 41 adjacent the end of recess 42, where interference between the tooth 43 and shoulder 41 is developed. The invention contemplates the use of a thermoplastic synthetic resin material (e.g. slightly plasticized polyvinyl chloride resin such as is commonly used in containers of tough, fairly flexible nature). I find that sufficient yield, in the threads and in compression yielding of tooth 43 and shoulder 41 can be obtained to provide for forcing the tooth 43 past the "high" end portion of shoulder 41 into recess 42 and, conversely, forcing the tooth out of the recess to a position riding on shoulder 41. As the unscrewing movement continues, the tooth 43 will withdraw from interference contact with shoulder 41.

In the use of the device, the cover 20, 21 is screwed down to its braking position, in which the braking load is adjusted to a sufficient value to hold the reel drum against the wind-up action of spring motor 29, and yet is sufficiently light so that the operator, by grasping the casing in one hand and pulling upon the cord 10 with the other hand, may withdraw any selected portion of the cord from the casing. Upon releasing the pull on the cord, the withdrawn portion will remain extended from the reel casing, the reel drum being locked against rotation. The prongs 13 may then be inserted into a service outlet and the plug 12 may be attached to an appliance to be powered. The withdrawn portion of the cord will remain in a slack condition between the appliance and the service outlet, assuming that a sufficient length of cord has been withdrawn from the reel. When the use of the appliance has been completed, the reel may be pulled away from the service outlet, the plug 12 detached from the appliance, and the cover section then unscrewed sufficiently to completely release the braking load. The reel drum is then free to rotate under the pull of spring motor 29 and the withdrawn section of cord will be quickly reeled into the casing and wound upon drum body 22.

*The preferred form of the invention, Figs. 7–12*

Figs. 7 to 12 inclusive illustrate a preferred form of the invention having some parts that are the same as in the previously described form of the invention and are accordingly indicated by the same reference numerals hereinbefore referred to. Other parts, indicated by corresponding reference numerals that are primed, are somewhat modified, including the lateral casing wall 16' of the casing A' which is slightly frusto conical for facilitating molding the casing in a thermoplastic synthetic resin material; telescoping flanges 18' of the casing and 20' of the cover, which have smooth cylindrical mating walls that are joined by a suitable adhesive (such as a solvent for the resin which softens the surfaces and causes them to bond to one another in the assembly of the device); and the lower flange 23' of the reel drum, which is thin and flat, is initially formed as a separate part with a central aperture, is pressed onto the rear trunnion 46 of the drum, and is seated against a shoulder 45 where trunnion 46 is integrally joined to the hub 22' of the drum.

Trunnion 46 is journalled in a cylindrical bearing cup 47 that is formed integrally in the center of bottom 17. In lieu of the circular flange 24 of Figs. 1–6, there is provided in the preferred form a combined flange and ratchet wheel 48 embodying teeth 49 with end pockets 50 adapted to receive a locking dog 51, and having ratcheting lateral margins. Locking dog 51 embodies a cylindrical cup which is secured upon a stem 52 received therein. Stem 52 extends through a slot 53 in cover wall 21 and is provided with a head 54 in the form of a thin flat disc of button form which is received in a shallow elongated recess 55 rimming the slot 53 and is slidable against the bottom of the recess 55. The slot 53 is of a length such as to accommodate shifting of the dog 51 between one limit position in which it is seated in one of the pockets 50 and another limit position in which it clears the tips of teeth 49 and permits free rotation of the reel in the cord unwinding direction. The slot 53 is disposed at an angle to a radius of the reel passing therethrough, and is inclined in such a direction that the dog 51 may be retracted to its outer limit position by camming action of the teeth 49 thereagainst when the reel rotates in cord unwinding direction in response to a pull applied to the cord; and, on the other hand, the dog will be wedged against one side of the slot 53 when seated in a ratchet pocket 50 and subjected to the winding up pull of spring 29. Thus the dog is locked and the reel drum is restrained against rotation.

It will now be apparent that, by simply grasping the casing A' in one hand and the cord in the other and pulling upon the cord, the locking dog 51 will be automatically shifted outwardly to a position where the ratchet disc 48 can rotate freely past the locking dog while any selected length of cord is pulled out of the reel; and by then shifting the locking dog 51 inwardly by pressing upon the head 54 with the thumb of the hand in which the casing A' is held, and shifting the thumb laterally toward the inner end of slot 53 while relaxing the pull upon the cord, the locking dog 51 will be moved into a pocket 50 and seated thereagainst as the reel drum is permitted to shift back under the pull of spring 29 to a position in which a pocket 50 receives the dog 51.

The preferred form differs from the form of Figs. 1–6 in the following additional particulars: formed integrally with bearing 47 and extending therefrom radially to the lateral wall 16' of the casing A' are a plurality of bearing lands 56 having upper faces lying in a common plane normal to the reel axis and providing separated bearing surfaces against which the lower edges of the spring 29 are seated. This bearing support for the spring minimizes the frictional drag of the spring against the bottom of the casing and accentuates the free action of the spring as it uncoils in order to wind up the cord B. At one end the spring 29 has an end portion bent to extend radially through a slot 57 in trunnion 46, and at its other end, spring 29 has a hook portion 58 of L-form, bearing against a lug 59 formed integrally with the casing bottom 17 and projecting upwardly therefrom. The lug 59 is spaced from lateral wall 16' by a space just slightly wider than the thickness of spring 29, and the end portion of the spring immediately adjacent the hook portion 58 is retained between the lug and the lateral wall portion 16'.

The stem 52 fits with sufficient snugness in slot 53 to provide a slight frictional resistance to the shifting of locking dog 51, assisting in preventing the locking dog from accidentally slipping out of a locking pocket 50 during handling of the reel after a selected length of cord has been extended therefrom. The locking dog is securely retained in assembly by engagement of its end against the underface of the thin web portion of cover top 21 surrounding the slot 53 and the engagement of the underface of head 54 against the upper face of said web portion. In the assembling of the device, a solvent or adhesive is applied to the stem 52 just prior to inserting it through the slot 53 and the cup element 51 is then applied over the stem 52 and the parts are allowed to become adhesively attached in this assembled state.

Hub 22' is of rectangular section corresponding to the cross section of plug 11. Front trunnion 26 has a circular periphery. Lower flange 23' may be adhesively secured to the trunnion 46 and hub 22'.

When the dog 51 has been engaged in a ratchet pocket 50, the operator can release the pull on the cord and the dog 51 will be retained in pocket 50 by a pocketing action under the yielding loading of spring 29 which will resist any tendency of the reel to rotate away from the locked position. Thus the locked condition of the reel will be automatically maintained until such time as the operator manually shifts the locking dog away from the ratchet disc to the release position and holds it in that position while the spring operates to wind the cord onto the reel.

I claim:

1. In an extension cord and cord reel for connecting an electric appliance to an electric power outlet, in combination: a casing including back, front and lateral wall members; a reel drum comprising a hub, a combined radial flange and ratchet wheel on the front end of said hub, adjoining said front wall member, a rear radial flange on the rear end of said hub, spaced axially from said back wall member, and front and rear trunnions extending axially from the respective ends of said hub beyond said flanges and journalled in said front and back wall members respectively; said hub having a cavity opening into its forward end and an L-shaped passage extending from the bottom of said cavity axially and thence radially through the periphery of said hub; an extension cord having a male connector plug adapted to be plugged into a power outlet including a body received in said cavity and prongs projecting beyond the front end of said hub, said cord extending from the rear end of said plug through said passage to the periphery of said hub, thence wound around said hub and thence extended radially outwardly, said casing having in said lateral wall an axially extending slot through which said cord projects, and said cord having at its outer end a female connector adapted to be connected to an appliance; a spiral spring disposed in the space between said rear flange and said back wall member, having one end encircling and attached to said rear trunnion, and having its other end anchored to the casing near said lateral wall member, said spring being arranged for winding said cord upon said reel when the latter is released for rotation; and a locking dog, shiftably mounted in and projecting through said front wall member of the casing, said dog being manually operable exteriorly of the casing, being engageable with said ratchet wheel when shifted in one direction, whereby to lock said reel against cord-retracting rotation, and disengageable from said ratchet wheel when shifted in an opposite direction, to release said reel for retracting said cord into the casing.

2. In an extension cord and cord reel for connecting an electric appliance to an electric power outlet, in combination: a casing including back, front and lateral wall members; a reel drum comprising a hub, a combined radial flange and ratchet wheel on the front end of said hub, adjoining said front wall member, a rear radial flange on the rear end of said hub, spaced axially from said back wall member, and trunnions extending axially from the respective ends of said hub beyond said flanges and journalled in said front and back wall members respectively; and extension cord having at one end a connector fixed to the front end of said hub, said cord extending through said hub, thence wound around said hub and thence extended radially outwardly, said casing having in said lateral wall an opening through which said cord projects; a spiral spring disposed in the space between said rear flange and said back wall member, having one end encircling and attached to said rear trunnion, and having its other end anchored to the casing near the junction between said lateral and back wall members; said spring being arranged for rotating said reel in cord-winding direction; and a locking dog shiftably mounted in and projecting through said front wall member of the casing, being manually operable exteriorly of the casing, being engageable with said ratchet wheel when shifted in one direction, whereby to lock said reel against cord-retracting rotation, and disengageable from said ratchet wheel when shifted in an opposite direction, to release said reel for retracting said cord into the casing.

3. A cord reel as defined in claim 2, wherein said front wall member has a slot extending in a direction generally chordal with respect to the periphery of said combined flange and ratchet wheel, wherein said dog has a stem extending through and slidable in said slot, and a head slidably bearing against an outer surface of said front wall member, said dog being engageable with said ratchet wheel when shifted inwardly, whereby to lock said reel against cord retracting rotation, and disengageable from said ratchet wheel when shifted outwardly, whereby to release said reel for winding up said cord.

4. A cord reel as defined in claim 3, wherein said front wall member has a shallow recess in its external face, framing said slot, and wherein said head is of button form, operable by engaging it under the thumb of a person's hand in which the casing is being held.

5. A cord reel as defined in claim 4, wherein said slot is disposed substantially at right angles to the direction of engagement of said dog by said combined flange and ratchet wheel.

6. In an extension cord and cord reel for connecting an electric appliance to an electric power outlet, in combination: a casing including flat parallel front and back wall members and a circular lateral wall member; a reel drum comprising a hub, a combined radial flange and ratchet wheel on the front end of said hub, bearing against the inner face of said front wall member and embodying ratchet teeth having dog-engaging pockets and ratcheting margins, a circular radial flange on the rear end of said hub, extending to said lateral wall member and spaced axially from said back wall member, and front and rear trunnions extending axially from the respective ends of said hub beyond said flanges and journalled in said front and back wall members respectively; said hub having a cavity opening into its forward end and an L-shaped passage extending from the bottom of said cavity axially and thence radially through the periphery of said hub; an extension cord having a male connector plug including a body received in said recess of the hub and prongs projecting beyond the front end of said hub, a cord extending from the rear of said plug body through said L-shaped passage to the periphery of said hub, thence wound around said hub thence extended radially outwardly, said casing having in said lateral wall an axially extending slot through which said cord projects, and said cord having at its outer end a female connector adapted to be plugged into a power outlet; a clock spring encircling and attached to said rear trunnion, disposed in the space between said rear flange and said rear wall member and attached to the casing at said lateral wall member; and a locking dog including a head of button form, a stem extending through said front wall member, and a cup member receiving and secured to the end of said stem and engageable in said ratchet teeth pockets, said front wall member being engaged between said head and cup and having a slot extending in a direction generally in line with the direction of ratcheting engagement of said dog by said ratcheting margins, said dog being engageable with said ratchet teeth when said dog is shifted inwardly and disengageable from said ratchet teeth when said dog is shifted outwardly.

7. In an extension cord and cord reel for connecting an electric appliance to an electric power outlet, in combination: a casing including flat parallel front and back wall members and a circular lateral wall member; a reel drum comprising a hub, a combined radial flange and ratchet wheel on the front end of said hub, adjoining said front wall member, a rear radial flange on the rear end of said hub, spaced axially from said back wall member, and front and rear trunnions extending axially from the respective ends of said hub beyond said flanges, said front wall member having a circular central opening in which said front trunnion is journalled, said back wall member having an internal bearing cup in which said rear trunnion is journalled and a plurality of spoke-like bearing lands radiating from said bearing cup to said lateral wall and having bearing faces disposed in a common radial plane; said rear trunnion having a diametral slot; a clock spring encircling said rear trunnion and having one end engaged in said slot, said spring being disposed in the space between said rear flange and said rear wall member and its other end being anchored to the casing near the junction between said lateral and back wall members, said spring being seated against said bearing faces of said lands; an extension cord having a male connector plug fixed to the front end of the hub, said cord extending through said hub and thence radially, thence wound around said hub and thence extended radially outwardly, said casing having in said lateral wall an axially extending slot through which said cord projects, and said cord having at its outer end a female connector adapted to be plugged into a power outlet; and a locking dog including a head bearing against an outer surface of said front wall member, a stem extending through and slidable in a generally radial direction in said front wall member, and a dog part inside said casing, said dog part being engageable with said ratchet wheel when said dog is shifted inwardly and disengageable from said ratchet wheel when said dog is shifted outwardly.

8. A cord reel as defined in claim 7, wherein said rear wall member has a lug extending forwardly in radially spaced relation to said lateral wall member and said spring has an end portion of L-form extending between said lug and said lateral wall and hooked against said lug to anchor the outer end of said spring to the casing.

(References on following page)

References Cited in the file of this patent

UNITED STATES PATENTS

| | | |
|---|---|---|
| 1,827,488 | Roach | Oct. 13, 1931 |
| 1,882,385 | Johnson | Oct. 11, 1932 |
| 1,978,644 | Metter | Oct. 30, 1934 |
| 2,585,070 | Allard | Feb. 12, 1952 |
| 2,720,365 | Kovalchik et al. | Oct. 11, 1955 |
| 2,732,531 | Janowiec | Jan. 24, 1956 |
| 2,769,154 | Greenbaum | Oct. 30, 1956 |

FOREIGN PATENTS

| | | |
|---|---|---|
| 606,035 | France | Feb. 27, 1926 |
| 290,446 | Great Britain | May 17, 1928 |